(12) United States Patent
Lussier

(10) Patent No.: US 7,159,918 B2
(45) Date of Patent: Jan. 9, 2007

(54) SLIDING BED EXTENDER ARRANGEMENT

(75) Inventor: Paul B. Lussier, Royal Oak, MI (US)

(73) Assignee: Nissan Technical Center North America, Inc. MI (US)

( * ) Notice: Subject to any disclaimer, the term of this patent is extended or adjusted under 35 U.S.C. 154(b) by 0 days.

(21) Appl. No.: 11/094,478

(22) Filed: Mar. 31, 2005

(65) Prior Publication Data

US 2006/0220404 A1  Oct. 5, 2006

(51) Int. Cl.
*B60P 3/34* (2006.01)

(52) U.S. Cl. ................. 296/26.09; 296/26.08

(58) Field of Classification Search ............ 296/26.08, 296/26.09
See application file for complete search history.

(56) References Cited

U.S. PATENT DOCUMENTS

| | | | |
|---|---|---|---|
| 5,456,511 A | * | 10/1995 | Webber .................. 296/26.09 |
| 5,700,047 A | | 12/1997 | Leitner et al. |
| 5,911,464 A | | 6/1999 | White |
| D417,859 S | | 12/1999 | Leitner et al. |
| D418,106 S | | 12/1999 | Leitner et al. |
| 6,113,173 A | | 9/2000 | Leitner et al. |
| 6,340,190 B1 | | 1/2002 | Rosebrugh et al. |
| 6,402,215 B1 | | 6/2002 | Leitner et al. |
| 6,425,618 B1 | | 7/2002 | Garland et al. |
| 2002/0164225 A1 | | 11/2002 | Snyder et al. |
| 2003/0146637 A1 | | 8/2003 | Leitner et al. |
| 2004/0131440 A1 | | 7/2004 | Womack et al. |

* cited by examiner

*Primary Examiner*—Joseph D. Pape
(74) *Attorney, Agent, or Firm*—Global IP Counselors

(57) ABSTRACT

A sliding bed extender arrangement is provided that basically has a vehicle cargo area, a pair of roller tracks, a pair of mounting arrangements and a bed extender. Each of the mounting arrangements has a pair of rolling members and a locking mechanism that are disposed in one of the roller tracks. Each of the mounting locking mechanism has a locking member slideably disposed in one of the roller tracks and a first hand operating portion operatively coupled to the locking member to selectively lock the mounting arrangement. The sliding bed extender has a generally U-shape as viewed from above with first and second side ends rigidly attached to the mounting arrangements to extend across the vehicle cargo area.

19 Claims, 9 Drawing Sheets

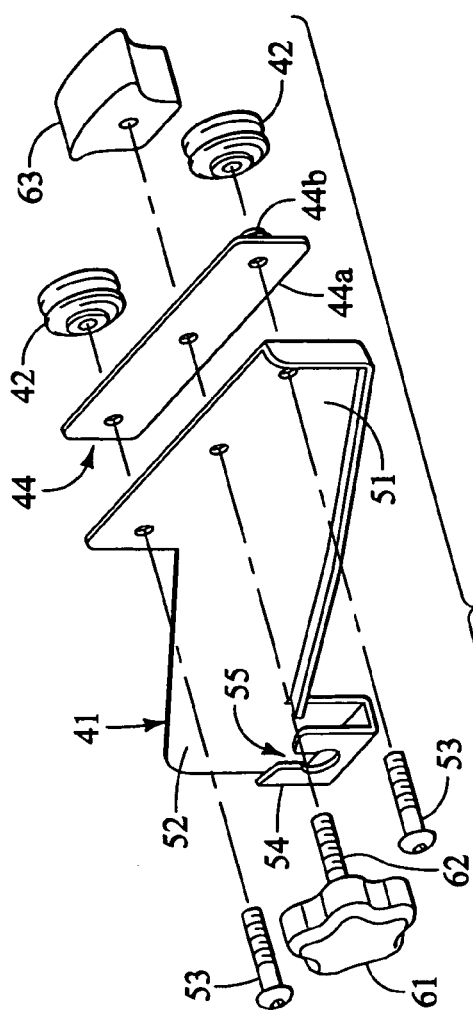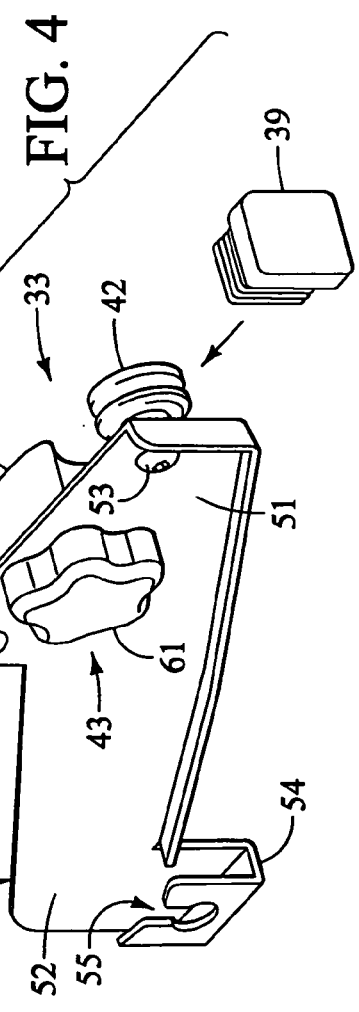

SLIDING BED EXTENDER ARRANGEMENT

BACKGROUND OF THE INVENTION

1. Field of the Invention

The present invention generally relates to an adjustable truck bed extender for a vehicle cargo area. More specifically, the present invention relates to a truck bed extender, which can be retained in several different positions within a pick-up truck cargo area.

2. Background Information

Pick-up trucks have increased in popularity in recent years. Some pick-up trucks are used primarily for work and others primarily for recreation. Many trucks do double-duty supporting both of these spheres of activity. Basically a pick-up truck has a storage bed in which a tailgate is pivotally mounted to side support portions of the storage bed. The explosion in the popularity of pick-up trucks and/or sport utility trucks (SUTs) has fueled a proliferation of new body configurations. Trucks are offered as standard cabs, king cabs, crew cabs, and the like. Likewise, truck interiors have been adapted to meet the needs for more comfort, more passenger capacity, and the like.

Recently, the cargo area of the pick-up truck has undergo a similar evolution. Typically, a standard full-sized pick-up bed is little more than a large empty volume with a few tie-down points scattered along the perimeter of its interior walls or along a bed rail. Generally speaking, bed usage may be grouped into three broad categories: hauling, securing, and separating items in the payload. Most truck users need to perform each of these tasks with some frequency. Yet the demands placed on the bed for hauling are significantly different from those needed to secure or separate items in and around the bed. Thus, various bed accessories have been offered to allow customization of the bed to suit a particular need.

For example, some automobile manufacturers have added a bed extender to increase the hauling capacity of the vehicle. Examples of some bed extenders are disclosed in the following U.S. publications: U.S. Pat. No. 5,700,047 to Leitner et al.; U.S. Pat. No. 5,911,464 to White; U.S. Pat. No. 6,311,173 to Leitner et al.; U.S. Pat. No. 6,340,190 to Rosebrugh et al.; U.S. Pat. No. 6,402,215 to Leitner et al.; U.S. Pat. No. 6,425,618 to Garland et al.; and U.S. Patent Publication No. 2003/0146637 to Leitner et al. However, none of these bed extenders are mounted to slide to a plurality of positions along the truck bed. Recently, a bed extender has been available for a pick-up truck that is mounted to a track system such as the one disclosed in U.S. Patent Publication No. 2002/0164225 to Snyder et al. However, the bed extender is not mounted in such a manner as to smoothly slide along the tracks.

In view of the above, it will be apparent to those skilled in the art from this disclosure that there exists a need for an improved adjustable truck bed extender. This invention addresses this need in the art as well as other needs, which will become apparent to those skilled in the art from this disclosure.

SUMMARY OF THE INVENTION

One object of the present invention is to provide a sliding bed accessory arrangement that is configured and arranged to smoothly slide along a pair of tracks using rollers.

In order to achieve the above object and other objects of the present invention, a sliding bed extender arrangement is provided that basically comprises a vehicle cargo area, a first roller track, a second roller track, a first mounting arrangement, a second mounting arrangement and a sliding bed extender. The vehicle cargo area includes a bed floor, a front cargo wall disposed on a forward end of the bed floor, a first side cargo wall disposed on a first lateral side of the bed floor, and a second side cargo wall disposed on a second lateral side of the bed floor. The first roller track is fixedly attached to the first side cargo wall of the vehicle cargo area. The second roller track is fixedly attached to the second side cargo wall of the vehicle cargo area in a parallel, spaced arrangement relative to the first roller track. The first mounting arrangement includes a pair of first rolling members and a first locking mechanism. The first rolling members are rollably disposed in the first roller track. The first locking mechanism has a first locking member and a first hand operating portion. The first locking member is slideably disposed in the first roller track. The first hand operating portion is operatively coupled to the first locking member to selectively move the first locking member between a first sliding position and a first locked position in which sliding of the first locking member is prevented. The second mounting arrangement includes a pair of first rolling members and a second locking mechanism. The second rolling members are rollably disposed in the second roller track. The second locking mechanism has a second locking member and a second hand operating portion. The second locking member is slideably disposed in the second roller track. The second hand operating portion is operatively coupled to the second locking member to selectively move the second locking member between a second sliding position and a second locked position in which sliding of the second locking member is prevented. The sliding bed extender has a generally U-shape as viewed from above with first and second side ends rigidly attached to the first and second mounting arrangements to extend across the vehicle cargo area.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 4 is a front end perspective view of one of the mounting arrangements being installed into one of the roller tracks in accordance with the present invention;

FIG. 5 is a exploded perspective view of the mounting arrangement illustrated in FIG. 4 that is used in the sliding bed extender arrangement in accordance with the present invention;

DETAILED DESCRIPTION OF THE PREFERRED EMBODIMENTS

Figure 1:
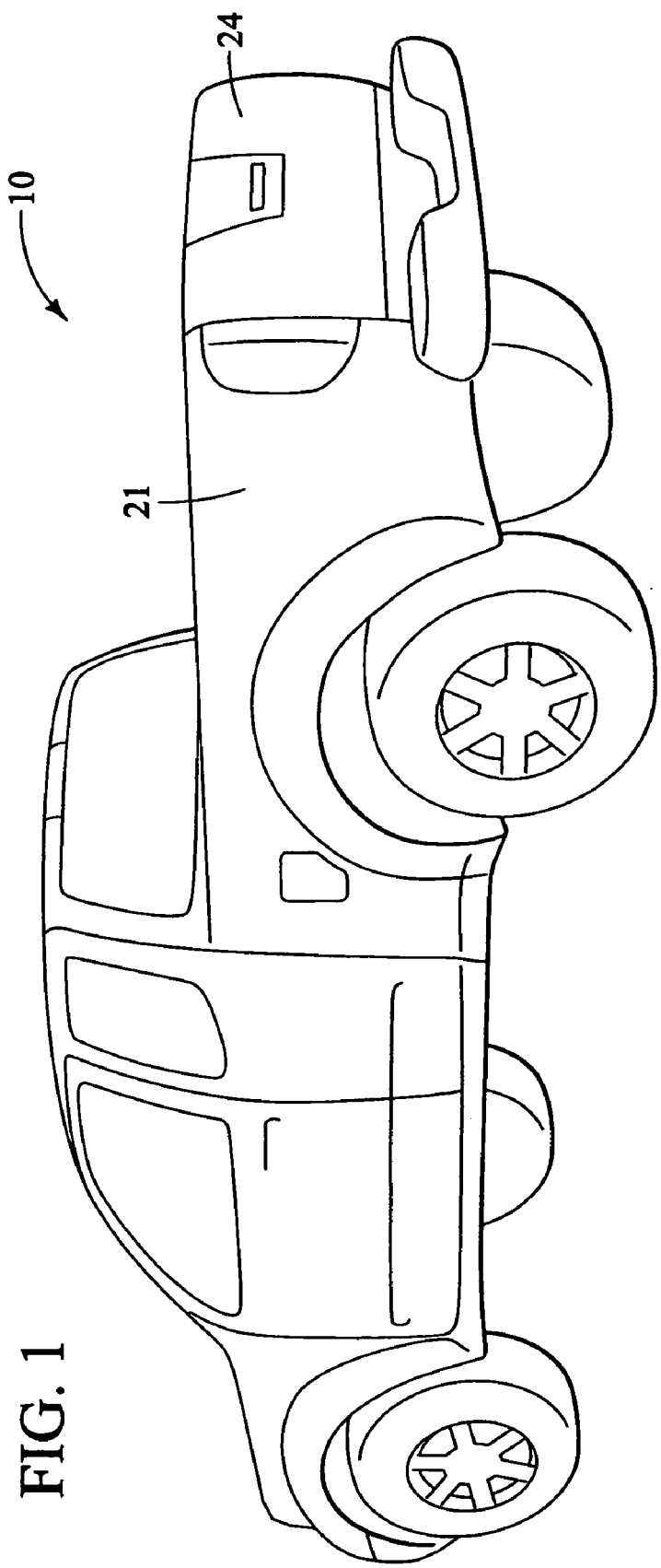
FIG. 1 is a rear side perspective view of a vehicle (pick-up truck) having a sliding bed extender arrangement in accordance with one embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1–5, a vehicle or pick-up truck 10 is illustrated that has a truck bed or vehicle cargo area 12 with a sliding bed accessory arrangement 14 in accordance with a first embodiment of the present invention. However, it will be apparent to those skilled in the art from this disclosure that the sliding bed accessory arrangement 14 of the present invention can be utilized in any of a variety of vehicles having a vehicle cargo area, such as vans and the like.

The vehicle cargo area 12 of the vehicle 10 basically has a bed floor 16, a front cargo wall 18, a pair of side cargo walls 21 and 22, and a rear tailgate 24. The front cargo wall 18 is disposed on a forward end of the bed floor 16 and interconnects the forward ends of the side cargo walls 21 and 22. The first side cargo wall 21 is disposed on a first lateral side of the bed floor 16, while the second side cargo wall 22 is disposed on a second lateral side of the bed floor 16. The tailgate 24 is pivotally coupled to the rearward ends of the side cargo walls 21 and 22. The vehicle cargo area 12 of the vehicle 10 is a relatively conventional structure that is well known in the art. Since vehicle cargo areas of pick-up trucks are well known in the art, the vehicle cargo area 12 will not be discussed or illustrated in detail herein.

Turning now to FIGS. 3–7, the sliding bed accessory arrangement 14 basically has a pair of roller tracks 32, a first mounting arrangement 33, a second mounting arrangement 34, and a sliding bed accessory or bed extender 35. It will be apparent to those skilled in the art from this disclosure that other sliding bed accessories can be mounted in accordance with the present invention. A first one of the roller tracks 32 is fixedly attached to the first side cargo wall 21 of the vehicle cargo area 12, while a second one of the tracks 32 is fixedly attached to the second side cargo wall 22 of the vehicle cargo area 12 in a parallel, spaced arrangement relative to the first one of the tracks. The sliding bed accessory or bed extender 35 is slideably supported on the roller tracks 32 by the first and second mounting arrangements 33 and 34.

Figure 2:
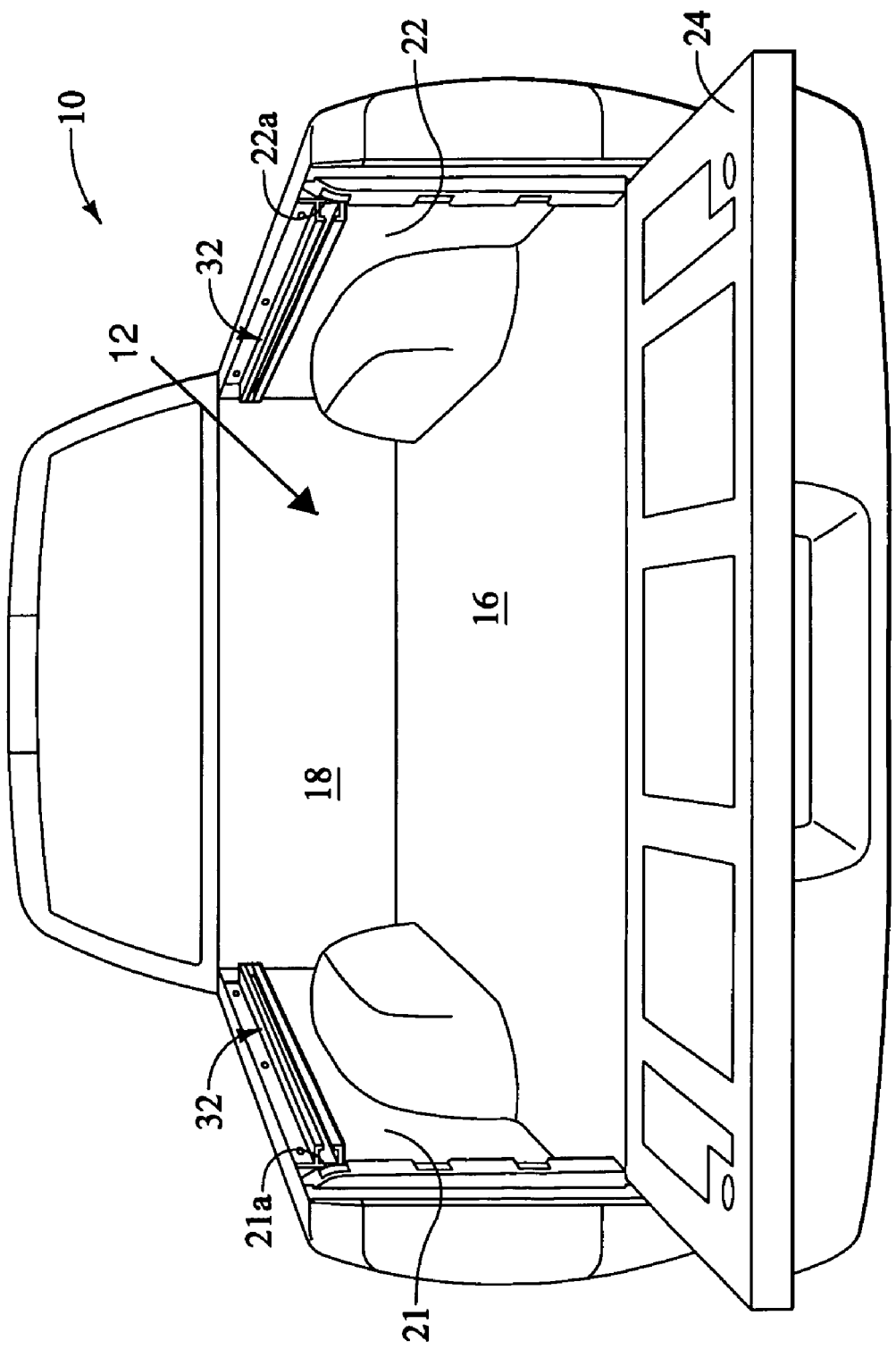
FIG. 2 is a rear elevational view of the vehicle illustrated in FIG. 1 having a pair of roller tracks that are used in the sliding bed extender arrangement in accordance with the present invention.
Figure 3:
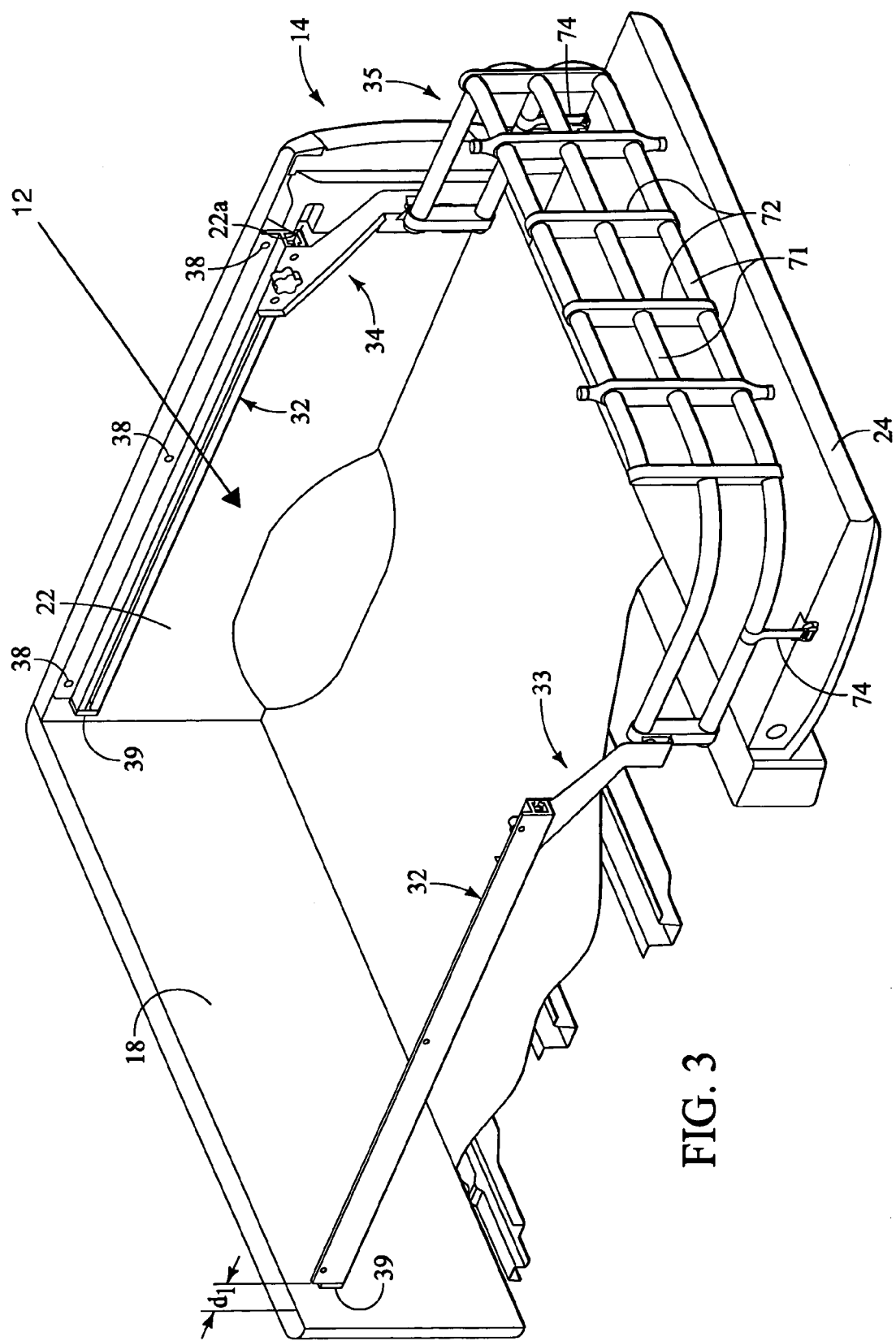
FIG. 3 is a partial top perspective view of a portion of the cargo area with a bed extender installed in the roller tracks in accordance with the present invention.

As seen in FIGS. 2 and 3, both of the roller tracks 32 have generally transverse C-shaped cross sections that open towards each other. The roller tracks 32 are preferably constructed of a hard rigid material such as metal. The roller tracks 32 are structurally identical to each other, but mounted as mirror images of each other. The first and second mounting arrangements 33 and 34 are slideably mounted within the roller tracks 32, as explained below. Since the roller tracks 32 are structurally identical to each other, only one of the roller tracks 32 will be discussed and/or illustrated in detail.

As seen in FIG. 4, the roller track 32 has a mounting flange 32a, an upper track portion 32b, a lower track portion 32c, a rear wall portion 32d and a pair of retaining lips 32e. The roller track 32 is a channel shaped member with the retaining lips 32e being turned inwardly to define a longitudinal slot or opening 36. The roller tracks 32 are fixedly attached to the first and second side cargo walls 21 and 22 of the vehicle cargo area 12 by a plurality of fasteners 38. Preferably, after the first and second mounting arrangements 33 and 34 are installed in the roller tracks 32, the front open ends are closed by a plastic cap 39 as seen in FIG. 2.

Figure 6:
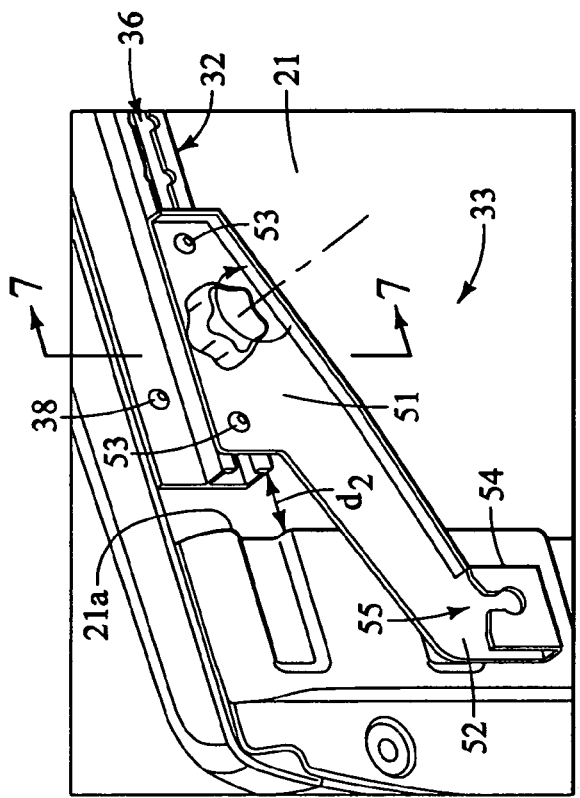
FIG. 6 is a rear end perspective view of one of the mounting arrangements located at a rearward end one of the roller tracks in accordance with the present invention.
Figure 7:
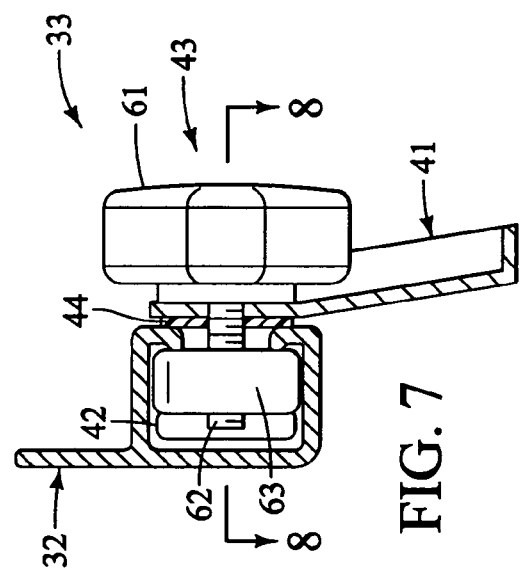
FIG. 7 is a partial cross sectional view of one of the mounting arrangements for the sliding bed accessory arrangement as viewed along section line 7—7 of FIG. 6 with the vehicle bed removed for clarity and selected parts shown in elevation.
Figure 8:
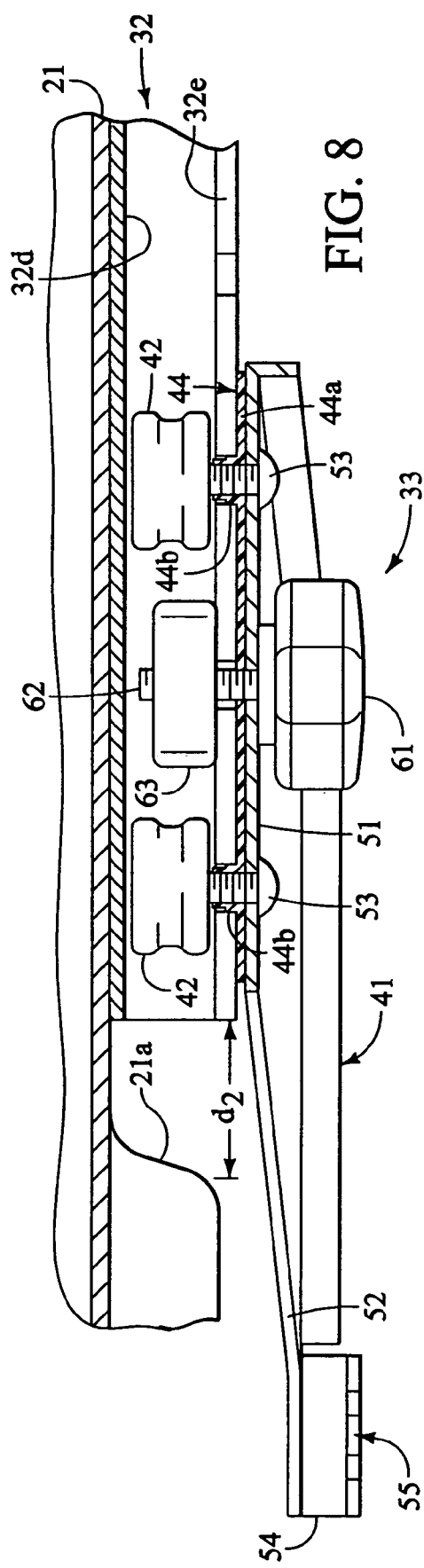
FIG. 8 is a partial cross sectional view of one of the mounting arrangements for the sliding bed accessory arrangement as viewed along section line 8—8 of FIG. 7 with the vehicle bed removed for clarity and selected parts shown in elevation.

Referring back to FIGS. 2 and 3 and to FIGS. 6 and 8, in this particular vehicle 10, the roller tracks 32 extend substantially the entire lengths of the first and second side cargo walls 21 and 22 of the vehicle cargo area 12. The roller tracks have rear open ends located near rearward end abutments (taillight housings) 21a and 22a, respectively, and front open ends spaced from the front cargo wall 18 by a predetermined distance $d_1$. The predetermined distance $d_1$ between the front open ends of the roller track 32 and the front cargo wall 18 is dimensioned to allow the mounting arrangements 33 and 34 to be installed and/or removed from the front open end of the track 32 as explained below. On the other hand, the rearward end abutments 21a and 22a are arranged so that the rear open ends of the roller tracks 32 are at least partial blocked to prevent the mounting arrangements 33 and 34 from being installed longitudinally into the rear open ends of the roller tracks 32. In particular, the spacings between the rear open ends of the tracks 32 and the rearward end abutments 21a and 22a are preferably a small predetermined distance $d_2$, which prevents the mounting arrangements 33 and 34 from being installed and/or removed from the rear open end of the track 32.

Basically, as seen in FIGS. 4–8, the first mounting arrangement 33 basically includes a mounting bracket 41, a pair of rollers or wheels 42, a locking mechanism 43, and a sliding member 44. The second mounting arrangement 34 has generally the same construction as the first mounting arrangement 33. In particular, the first and second mounting arrangements 33 and 34 are constructed of the identical parts, except for the mounting brackets 41, which are mirror images of each other, as seen in FIG. 3. Thus, the identical parts of the first and second mounting arrangements 33 and 34 will be given the same reference numbers. Moreover, it will be apparent from this disclosure that the descriptions and illustrations of the first mounting arrangement 33 apply to the second mounting arrangement 34.

Once the first and second mounting arrangements 33 and 34 are installed, the second mounting arrangement 34 is the mirror image of the first mounting arrangement 33 as seen in FIG. 3. The first and second mounting arrangements 33 and 34 slideably support the opposite side ends of the sliding bed extender 35 within the roller tracks 32. As will be explained in further detail below, the first and second mounting arrangements 33 and 34 provide for easily moving the sliding bed extender 35 along the longitudinal length of the vehicle cargo area 12. Moreover, the first and second mounting arrangements 33 and 34 are configured and arranged to lock the sliding bed extender 35 in plurality of positions along the longitudinal length of the vehicle cargo area 12.

Each of the mounting brackets 41 is preferably constructed of a hard rigid material such as a metal material. Preferably, the mounting brackets 41 are each formed as a one-piece unitary member from a sheet metal material. Each of the mounting brackets 41 has an upper bracket portion 51 and a lower bracket portion 52. The upper bracket portion has the rollers 42 rotatably mounted thereto as well as the locking mechanism 43 movably mounted thereto. In particular, the upper bracket portion 51 rotatably supports the rollers 42 via a pair of attachment pins or bolts 53, while the locking mechanism 43 is movably mounted thereto as explained below.

As seen in FIGS. 4 and 8, the locking mechanism 43 is mounted to the upper bracket portion 51 so as to be located midway between the rollers 42. The rollers 42 and the locking mechanism 43 are longitudinal aligned with each other to slide with in one of the tracks 32. The lower bracket portion 52 extends rearwardly from below the upper bracket portion 51 to support one of the side ends of the sliding bed extender 35. Preferably, the lower bracket portion 52 includes a U-shaped attachment member 54 with an open ended slot 55 for attaching an end of the sliding bed extender 35 thereto.

The rollers 42 are preferably constructed of a hard rigid material such that they can smoothly roll within the roller tracks 32. As previously mentioned, the rollers 42 are rotatably mounted to the mounting brackets 41 by the bolts 53. The rollers 42 can be constructed of any suitable materials such as a hard plastic or a metal roller as need and/or desired. For example, the rollers 42 are preferably sealed rubber wheels that are made of a steel center tube surrounded by a nylon ring that is coated with a hard rubber. Preferably, the rollers 42 are identical.

The sliding member 44 is positioned between the upper bracket portion 51 and the rollers 42 to overlie surface of the upper bracket portion 51 that faces the roller track 32. The sliding member 44 is preferably made of a material having a low coefficient of friction relative to the metal of the upper bracket portion 51 of the mounting bracket 41 so that the sliding bed extender 35 moves smoothly among a plurality of positions within the vehicle cargo area 12. For example, the sliding member 44 is constructed as a fiberglass reinforced nylon insert. Basically, the sliding member 44 has a plate shaped portion 44a and a pair of projections 44b with holes that the pins or bolts 53 pass through. Preferably, the plate shaped portion 44a of the sliding member 44 has an overall rectangular shape. The projections 44b are sized to be received in the slots 36 and maintain the rollers 42 at a predetermined spacing from the plate shaped portion 44a.

As seen in FIGS. 4–8, the locking mechanism 43 preferably includes a knob 61 with a threaded shaft 62 and an anchor plate or a locking member 63. The locking member 63 is preferably a rectangularly shaped member that is configured an arranged such that when the locking member 63 is received in one of the roller tracks 32, the locking member 63 will not rotate relatively to the roller track 32. The locking member 63 has a threaded bore that threadedly receives a threaded shaft 62 of the knob 61. Thus, the knob 61 constitutes a hand operating member that is rotatable to move the locking member 63 between a sliding or unlock position and a locked position. More specifically, rotation of the knob 61 causes the threaded shaft 62 to be threaded into or out of the threaded hole of the locking member 63 such that the locking member 63 is moved transversely relative to the respective one of the roller tracks 32 in response to rotation of the knob 61. In the locking position, the locking member 61 is configured and arranged to fixedly engage the interior surfaces of the retaining lips 32e of one of the roller tracks 32. In the sliding or unlocked position, the knob 61 is rotated such that the locking member 63 is moved transversely away from the retaining lips 32e of one of the roller tracks 32 such that the entire mounting arrangement 33 or 34 can move longitudinally along the respective one of the roller tracks 32 via the rollers 42.

Referring now to FIGS. 12–16, the sliding bed extender 35 preferably has a generally U-shaped as seen from above when the first and second side ends of the sliding bed extender 35 are rigidly attached to the first and second mounting arrangements 33 and 34 to extend or divide the vehicle cargo area 12. More specifically, the sliding bed extender 35 preferably includes a plurality of U-shaped tubular members 71 that are coupled together by a plurality of spacers 72. Each side end of the sliding bed extender 35 is provided with a headed pin 73 that is received in the open ended slot 55 for coupling the sliding bed extender 35 to the mounting arrangements 33 and 34. Preferably, the sliding bed extender 35 is also provided with a pair of retaining straps 74 that are connected to the latching mechanism 24a of the tailgate 24 in a conventional manner.

Figure 10:
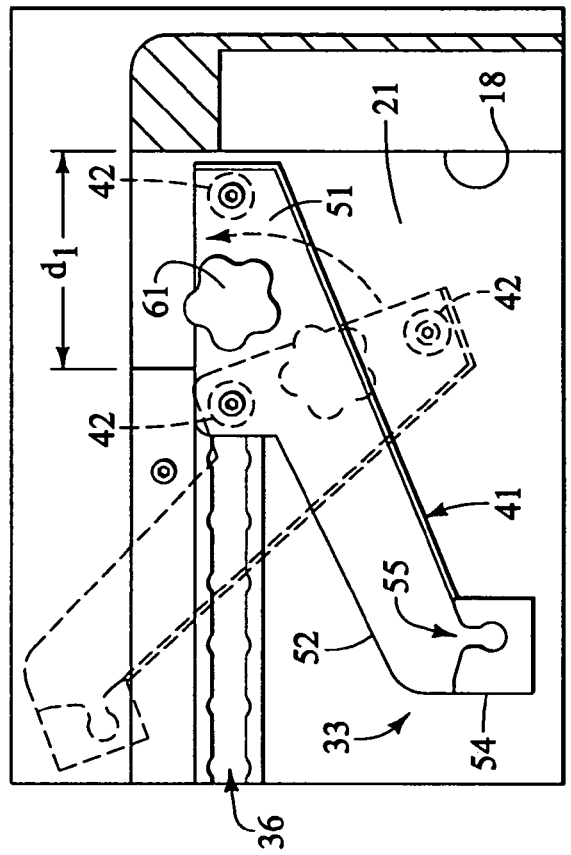
FIG. 10 is a partial perspective view of a portion of the cargo area showing a subsequent installation step from FIG. 9 for installing the mounting arrangements into the roller tracks in accordance with the present invention.
Figure 9:
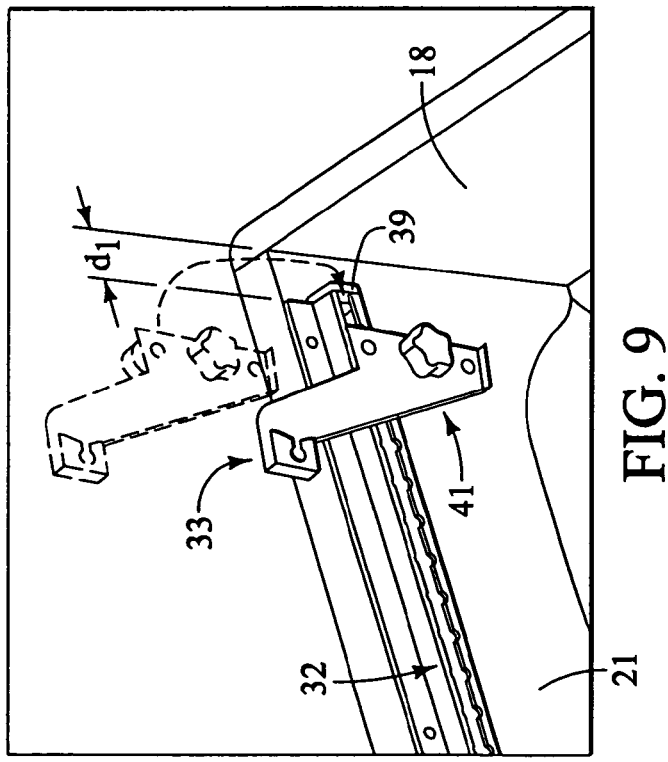
FIG. 9 is a partial perspective view of a portion of the cargo area showing an initial installation step of installing the mounting arrangements into the roller tracks in accordance with the present invention.
Figure 12:
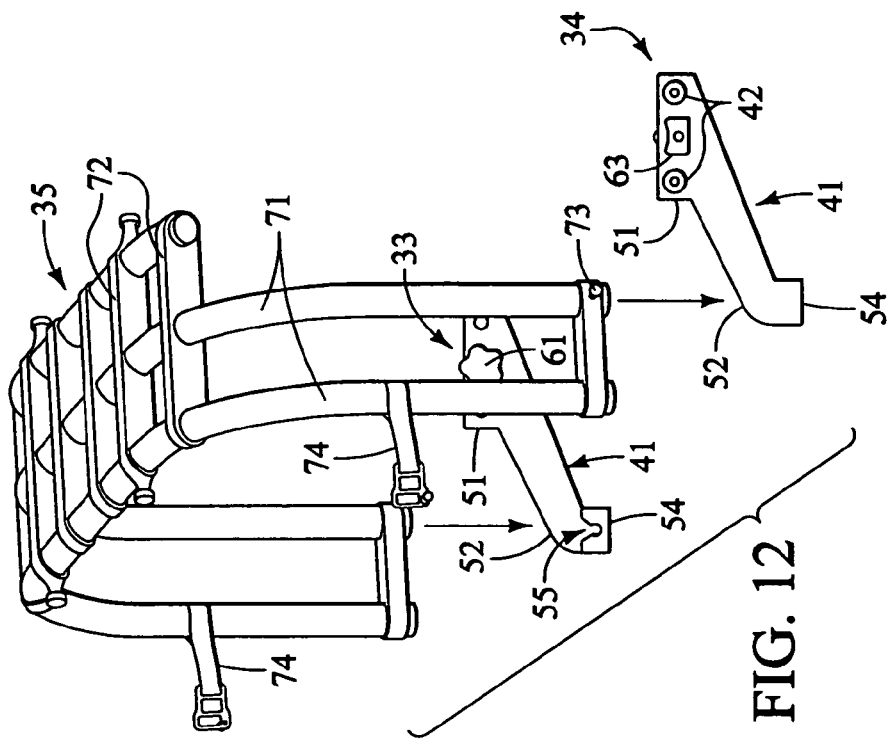
FIG. 12 is a rear exploded perspective view of the sliding bed extender arrangement in accordance with the present invention.
Figure 11:
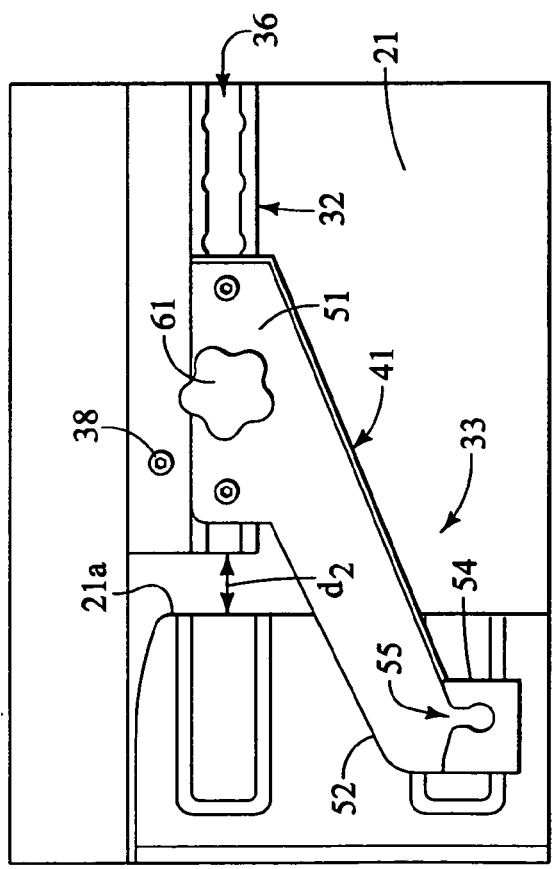
FIG. 11 is a partial perspective view of a portion of the cargo area showing a final installation step for installing the mounting arrangements into the roller tracks in accordance with the present invention.

Referring now to FIGS. 9–16, the installation of the sliding bed extender arrangement 14 will now be discussed. First, the roller tracks 32 are mounted to the first and second side cargo walls 21 and 22 respectively, as previously seen in FIG. 2. As seen in FIG. 9, the next step is to install the mounting arrangements 33 and 34 into the associated roller tracks 32. In this preferred embodiment, the mounting arrangements 33 and 34 are inserted into the open front ends of the roller tracks 32. In particular, the rear roller 42 is first inserted into the open front end of the roller track 32 with the mounting bracket 41 being generally vertically arranged. Then, the mounting bracket 41 is rotated about the pivot axis of the rear roller 42 that is located in the roller track such that the locking member 63 and the other (front) roller 42 is horizontally aligned with the longitudinal axis of the roller track 32 as seen in FIG. 10. Now, the locking member 63 and the other (front) roller 42 can be moved into the roller track 32 by longitudinal movement of the mounting bracket 41 relative to the longitudinal axis of the roller track 32.

Figure 14:
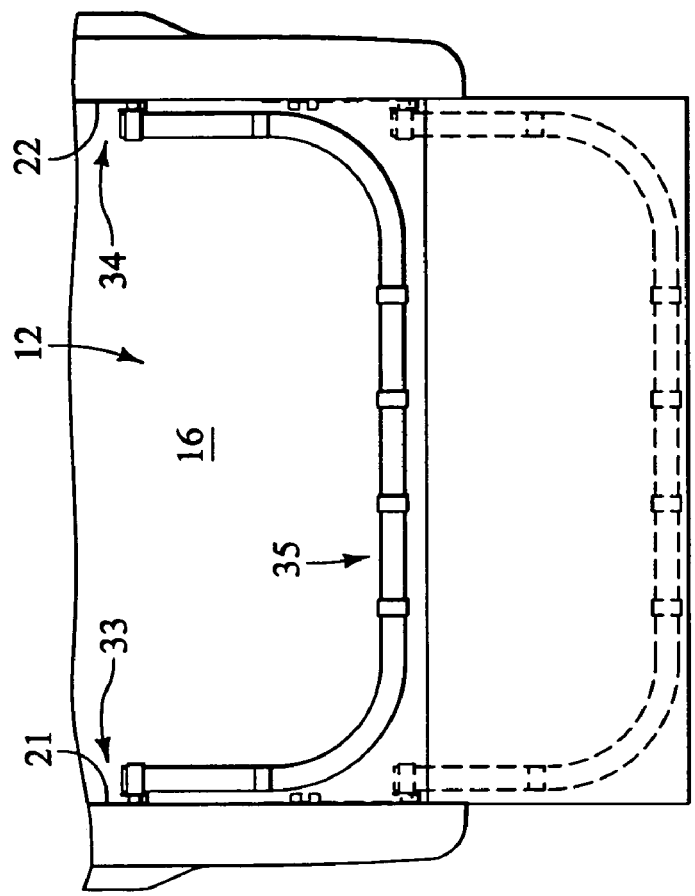
FIG. 14 is a top plan view of the sliding bed extender arrangement showing the bed extender being movable between one of a plurality of outward use orientations in accordance with the present invention.
Figure 13:
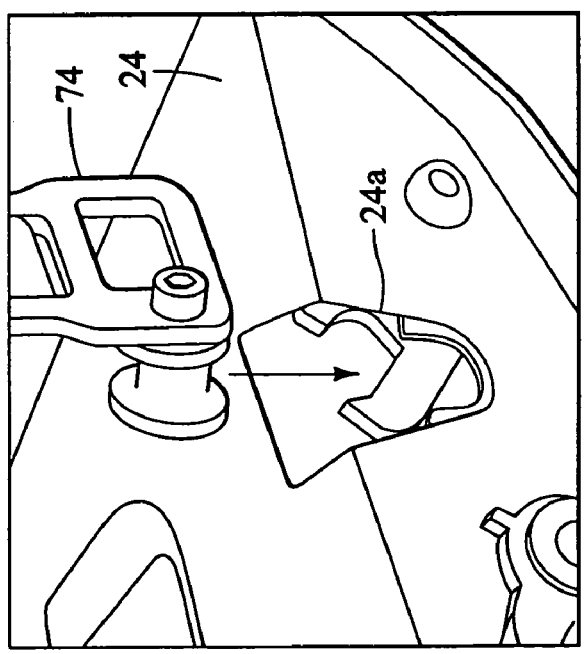
FIG. 13 is an enlarged partial perspective view of one end of the attachments between the tailgate and the bed extender in accordance with the present invention.
Figure 16:
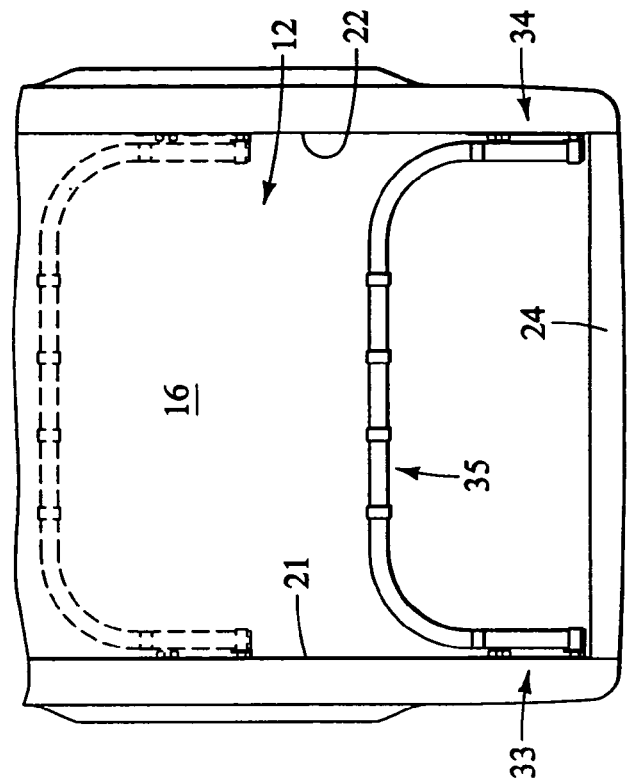
FIG. 16 is a top plan view of the sliding bed extender arrangement showing the bed extender being movable between one of a plurality of inward use orientations in accordance with the present invention.
Figure 15:
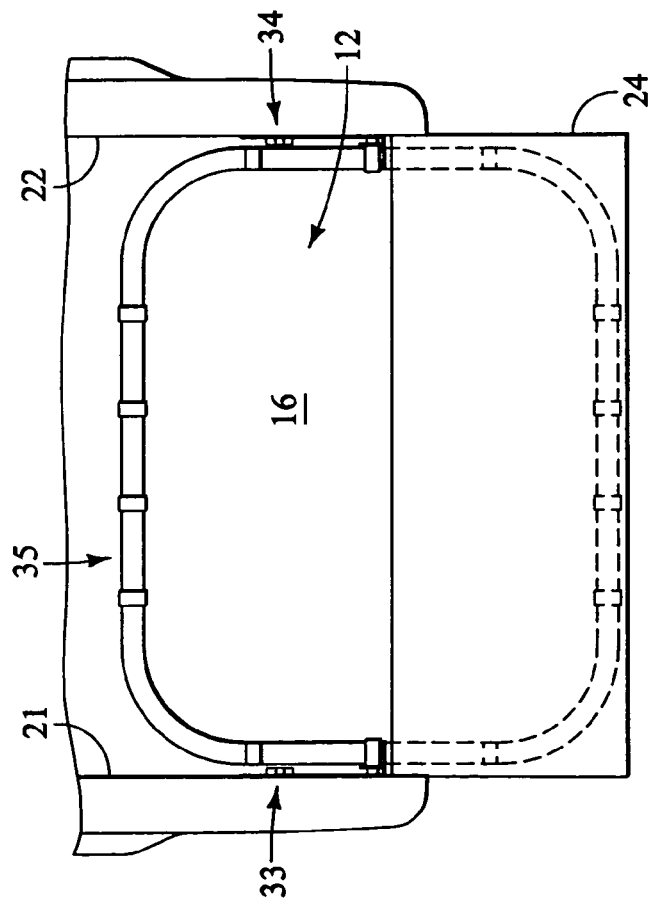
FIG. 15 is a top plan view of the sliding bed extender arrangement showing the bed extender being pivoted between an outward use orientation to an inward use orientation in accordance with the present invention.

Now, the two mounting arrangements 33 and 34 are moved to the rear end of the vehicle cargo area 12 and the first and second side ends of the sliding bed extender 35 are rigidly attached to the first and second mounting arrangements 33 and 34 to extend or divide the vehicle cargo area 12. More specifically, the headed pins 73 of the sliding bed extender 35 are inserted into the open ended slots 55 of the mounting brackets 41 for coupling the sliding bed extender 35 to the mounting arrangements 33 and 34. The sliding bed extender 35 can now be easily moved to a plurality of positions as seen in FIGS. 14–16. When, the sliding bed extender 35 is overlying the tailgate 24 in an outward orientation, as seen in phantom lines in FIG. 14, the retaining straps 74 are connected to the latching mechanism 24a of the tailgate 24 in a conventional manner as seen in FIG. 13.

As used herein to describe the above embodiment, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A sliding bed extender arrangement comprising:
   a vehicle cargo area including a bed floor, a front cargo wall disposed on a forward end of the bed floor, a first side cargo wall disposed on a first lateral side of the bed floor, and a second side cargo wall disposed on a second lateral side of the bed floor;
   a first roller track fixedly attached to the first side cargo wall of the vehicle cargo area;
   a second roller track fixedly attached to the second side cargo wall of the vehicle cargo area in a parallel, spaced arrangement relative to the first roller track;
   a first mounting arrangement including a pair of first rolling members rollably disposed in the first roller track and a first locking mechanism with a first locking member slideably disposed in the first roller track and a first hand operating portion operatively coupled to the first locking member to selectively move the first locking member between a first sliding position and a first locked position in which sliding of the first locking member is prevented;
   a second mounting arrangement including a pair of second rolling members coupled in the second roller track rollably disposed in the first roller track and a second locking mechanism with a second locking member slideably disposed in the second roller track and a second hand operating portion operatively coupled to the second locking member to selectively move the second locking member between a second sliding position and a second locked position in which sliding of the second locking member is prevented; and
   a sliding bed extender having a generally U-shape as viewed from above with first and second side ends rigidly attached to the first and second mounting arrangements to extend across the vehicle cargo area.

2. The sliding bed extender arrangement according to claim 1, wherein
   the first and second roller tracks have generally transverse C-shaped cross sections that open towards each other.

3. The sliding bed extender arrangement according to claim 1, wherein
   the first locking member is disposed in the first roller track between the first rolling members; and
   the second locking member is disposed in the second roller track between the second rolling members.

4. The sliding bed extender arrangement according to claim 1, wherein
   the first locking member is shaped relative to the first roller track to prevent rotation of the first locking member about a first threaded shaft section within the first roller track; and
   the second locking member is shaped relative to the second roller track to prevent rotation of the second locking member about a second threaded shaft section within the second roller track.

5. The sliding bed extender arrangement according to claim 1, wherein
   the first hand operating portion is a first rotatable knob that is rotated to move the first locking member between the first sliding and locked positions; and
   the second hand operating portion is a second rotatable knob that is rotated to move the second locking member between the second sliding and locked positions.

6. The sliding bed extender arrangement according to claim 5, wherein
   the first rotatable knob includes a first threaded shaft that is threadedly coupled to the first locking member to move the first locking member transversely relative to the first roller track upon rotating the first rotatable knob; and
   the second rotatable knob includes a second threaded shaft that is threadedly coupled to the second locking member to move the second locking member transversely relative to the second roller track upon rotating the second rotatable knob.

7. The sliding bed extender arrangement according to claim 1, wherein
   the first and second side ends of the sliding bed extender are pivotally supported by the first and second mounting arrangements to move approximately 180 degrees.

8. The sliding bed extender arrangement according to claim 1, wherein
   the first mounting arrangement includes a first upper bracket portion with the first rolling members and the first locking mechanism mounted thereto and a first lower portion extending rearwardly from below the first upper bracket portion to support the first end of the sliding bed extender; and the second mounting arrangement includes a second upper bracket portion with the second rolling members and the second locking mechanism mounted thereto and a second lower portion extending rearwardly from below the second upper bracket portion to support the second end of the sliding bed extender.

9. The sliding bed extender arrangement according to claim 1, wherein
the first locking member is configured to frictionally engage the first roller track when moved transversely from the first sliding position to the first locked position; and
the second locking member is configured to frictionally engage the second roller track when moved transversely from the second sliding position to the second locked position.

10. The sliding bed extender arrangement according to claim 1, wherein
the first rolling members and the first locking member are longitudinally aligned within the first roller track to define a first sliding portion with a first overall longitudinal dimension that is greater than a front end spacing between a front end of the first roller track and the front cargo wall and a rear end spacing between a rear end of the first roller track and a rear end abutment that is axially aligned with the first roller track such that the first overall longitudinal dimension of the first sliding portion is too long to be inserted into the first roller track in a single axial motion; and
the second rolling members and the second locking member are longitudinally aligned within the second roller track to define a second sliding portion with a second overall longitudinal dimension that is greater than a front end spacing between a front end of the second roller track and the front cargo wall and a rear end spacing between a rear end of the second roller track and a rear end abutment that is axially aligned with the second roller track such that the second overall longitudinal dimension of the second sliding portion is too long to be inserted into the second roller track in a single axial motion.

11. The sliding bed extender arrangement according to claim 10, wherein
the first rolling members are dimensioned relative to the first locking member such that when a first one of the first rolling members is disposed in the first roller track, a second one of the first rolling members and the first locking member can be rotated about a rotational axis of the first one of the first rolling members into the front end spacing between the front end of the second roller track and the front cargo wall so as to be aligned with the first roller track and then inserted into the first roller track; and
the second rolling members are dimensioned relative to second first locking member such that when a first one of the second rolling members is disposed in the second roller track, a second one of the second rolling members and the second locking member can be rotated about a rotational axis of the first one of the second rolling members into the front end spacing between the front end of the second roller track and the front cargo wall so as to be aligned with the second roller track and then inserted into the first roller track.

12. A sliding bed extender arrangement comprising:
a vehicle cargo area including a bed floor, a front cargo wall disposed on a forward end of the bed floor, a first side cargo wall disposed on a first lateral side of the bed floor with a first rear end abutment, and a second side cargo wall disposed on a second lateral side of the bed floor with a second rear end abutment;
a first roller track having a transverse C-shaped cross section that is attached to the first side cargo wall with the first roller track having a first longitudinal side opening, a first front end opening spaced rearwardly from the front cargo wall by at least a first predetermined distance and a first rear end opening spaced forwardly less than a second predetermined distance from the first rear end abutment;
a second roller track having a transverse C-shaped cross section that is attached to the second side cargo wall with the second roller track having a second longitudinal side opening, a second front end opening spaced rearwardly from the front cargo wall by at least the first predetermined distance and a second rear end opening spaced forwardly less than the second predetermined distance from the second rear end abutment;
a first mounting arrangement including a pair of first rolling members rollably disposed in the first roller track with the first mounting arrangement being configured and dimensioned relative to the first and second predetermined distances such that the first mounting arrangement is installable in the first front end opening of the first roller track and non-removable from the first rear end opening;
a second mounting arrangement including a pair of second rolling members to be rollably disposed in the second roller track with the second mounting arrangement being configured and dimensioned relative to the first and second predetermined distances such that the second mounting arrangement is installable in the second front end opening of the first roller track and non-removable from the second rear end opening; and
a sliding bed extender having a generally U-shape as viewed from above with first and second ends rigidly attached to the first and second mounting arrangements to extend the vehicle cargo area.

13. The sliding bed extender arrangement according to claim 12, further comprising
a first locking member disposed in the first roller track between the first rolling members and arranged to selectively move the first locking member between a first sliding position and a first locked position in which sliding of the first locking member is prevented; and
a second locking member disposed in the second roller track between the second rolling members and arranged to selectively move the second locking member between a second sliding position and a second locked position in which sliding of the second locking member is prevented.

14. The sliding bed extender arrangement according to claim 13, wherein
the first locking member is shaped relative to the first roller track to prevent rotation of the first locking member about a first threaded shaft section within the first roller track; and
the second locking member is shaped relative to the second roller track to prevent rotation of the second locking member about a second threaded shaft section within the second roller track.

15. The sliding bed extender arrangement according to claim 13, further comprising
a first hand operating portion coupled to the first locking member to move the first locking member between the first sliding position and the first locked position; and a second hand operating portion coupled to the second locking member to move the second locking member between the second sliding position and the second locked position.

16. The sliding bed extender arrangement according to claim 15, wherein
the first hand operating portion includes a first threaded shaft that is threadedly coupled to the first locking member to move the first locking member transversely relative to the first roller track upon moving the first hand operating portion; and
the second hand operating portion includes a second threaded shaft that is threadedly coupled to the second locking member to move the second locking member transversely relative to the second roller track upon moving the second hand operating portion.

17. The sliding bed extender arrangement according to claim 12, wherein
the first and second ends of the sliding bed extender are pivotally supported by the first and second mounting arrangements to move approximately 180 degrees.

18. The sliding bed extender arrangement according to claim 12, wherein
the first mounting arrangement includes a first upper bracket portion with the first rolling members and a first locking mechanism mounted thereto and a first lower portion extending rearwardly from below the first upper bracket portion to support the first end of the sliding bed extender; and
the second mounting arrangement includes a second upper bracket portion with the second rolling members and a second locking mechanism mounted thereto and a second lower portion extending rearwardly from below the second upper bracket portion to support the second end of the sliding bed extender.

19. The sliding bed extender arrangement according to claim 12, further comprising
a first locking member frictionally engaged with the first roller track when moved transversely from a first sliding position to a first locked position; and
a second locking member frictionally engaged with the second roller track when moved transversely from a second sliding position to a second locked position.

* * * * *